(12) United States Patent
Seethaler et al.

(10) Patent No.: US 9,052,917 B2
(45) Date of Patent: Jun. 9, 2015

(54) DATA STORAGE FOR REMOTE ENVIRONMENT

(71) Applicant: Lenovo (Singapore) Pte. Ltd., Singapore (SG)

(72) Inventors: Kenneth S. Seethaler, Wake Forest, NC (US); Randall S. Springfield, Chapel Hill, NC (US); Howard J. Locker, Cary, NC (US); Richard W. Cheston, Pittsboro, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 223 days.

(21) Appl. No.: 13/741,274

(22) Filed: Jan. 14, 2013

(65) Prior Publication Data

US 2014/0201512 A1    Jul. 17, 2014

(51) Int. Cl.
*G06F 15/177* (2006.01)
*G06F 9/44* (2006.01)
*G06F 9/445* (2006.01)
*G06F 21/00* (2013.01)

(52) U.S. Cl.
CPC .......... *G06F 9/4406* (2013.01); *G06F 9/44505* (2013.01); *G06F 21/00* (2013.01)

(58) Field of Classification Search
CPC ..................................................... G06F 9/4406
USPC ................................ 709/220, 217, 200; 713/2
See application file for complete search history.

(56) References Cited

U.S. PATENT DOCUMENTS

| | | |
|---|---|---|
| 8,239,662 B1 | 8/2012 | Nelson |
| 2003/0097275 A1* | 5/2003 | Kato .................................. 705/1 |
| 2003/0195995 A1 | 10/2003 | Tabbara |
| 2005/0066337 A1 | 3/2005 | Quinn |
| 2011/0145817 A1 | 6/2011 | Grzybowski |
| 2013/0013727 A1 | 1/2013 | Walker |
| 2014/0108951 A1* | 4/2014 | Dharawat et al. ............. 715/747 |

OTHER PUBLICATIONS

UK IPO, Combined SER, GB1320652.9, Apr. 24, 2014 (8 pages).

* cited by examiner

*Primary Examiner* — El Hadji Sall
(74) *Attorney, Agent, or Firm* — Brian J. Pangrle (57) ABSTRACT

A method can include receiving operating system environment settings via a network; storing the received operating system environment settings to a storage device; establishing an operating system environment according to the stored operating system environment settings; receiving information via the network; instructing the established operating system environment according to the received information; and, in response to the instructing, transmitting via the network information generated at least in part by the established operating system environment. Various other apparatuses, systems, methods, etc., are also disclosed.

17 Claims, 9 Drawing Sheets

DATA STORAGE FOR REMOTE ENVIRONMENT

TECHNICAL FIELD

Subject matter disclosed herein generally relates to technologies and techniques for establishing a remote environment.

BACKGROUND

A computer can include a drive for storage of various types of information such as an operating system, applications, settings, etc. To preserve information stored on a drive as well as a full operating environment, a cloning or imaging process may be implemented. Such processes create a duplicate operational drive (cloning) or an image file, which can be quite large as it includes the operating system, applications, etc.

SUMMARY

A method can include receiving operating system environment settings via a network; storing the received operating system environment settings to a storage device; establishing an operating system environment according to the stored operating system environment settings; receiving information via the network; instructing the established operating system environment according to the received information; and, in response to the instructing, transmitting via the network information generated at least in part by the established operating system environment. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
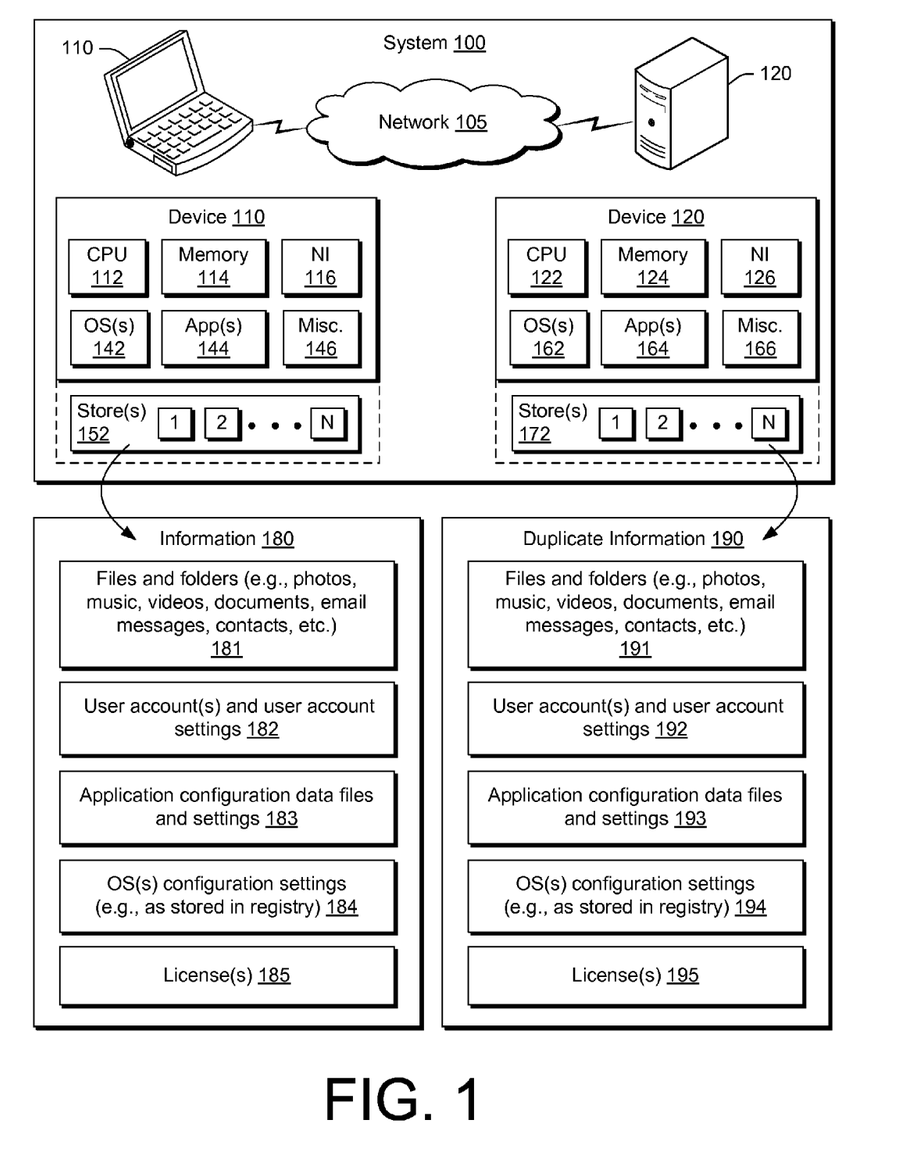
FIG. 1 is a diagram of an example of a system.

FIG. 1 shows an example of a system 100 that includes a network 105, a device 110 and a device 120. The system 100 may be a distributed environment, for example, a so-called "cloud" environment where various devices, components, etc. interact for purposes of data storage, communications, computing, etc. In the example of FIG. 1, the network 105 may include one or more of the Internet (e.g., where communication occurs via one or more Internet protocols), a cellular network, a satellite network, etc.

As an example, the device 110 may include a processor 112, memory 114, a network interface 116, one or more operating systems (OSs) 142, one or more applications (Apps) 144 and miscellaneous circuitry 146. As shown in the example of FIG. 1, the device 110 may include one or more data stores 152 that are accessible by the device 110 as being a component of the device 110 or otherwise operatively coupled to the device 110. As an example, a data store may be operatively coupled to a device where communication occurs via a non-Internet protocol or an Internet protocol or a combination of different types of protocols.

As an example, the device 120 may include a processor 122, memory 124, a network interface 126, one or more operating systems (OSs) 162, one or more applications (Apps) 164 and miscellaneous circuitry 166. As shown in the example of FIG. 1, the device 120 may include one or more data stores 172 that are accessible by the device 120 as being a component of the device 120 or otherwise operatively coupled to the device 120. As an example, a data store may be operatively coupled to a device where communication occurs via a non-Internet protocol or an Internet protocol or a combination of different types of protocols.

As an example, a data store may be a drive such as a hard disk drive (HDD) or a solid-state drive (SDD). A HDD can include a head that interacts with a spinning disk or platter that can store information. A HDD may be referred to as an electromechanical device. A SDD can include NAND-based flash memory that can retain information (e.g., persist information) without reliance on a power source, RAM coupled to a power source, or a combination of NAND-based flash memory and RAM. A hybrid drive may include features of an HDD and features of a SDD. As an example, a HDD can include buffer memory, for example, to provide for disk-to-buffer and buffer-to-disk information transfers.

HDD data transfer rate can depend on rotational speed of a disk and its data recording density. Thus to achieve high data transfer rates, a HDD may be configured to operate at high rotational speeds (e.g., over 5,000 rpm to achieve a data transfer rate in excess of about 100 MB/s). However, heat, vibration or heat and vibration can limit rotational speed of a disk. Higher rotational speeds may require more power, which due to inefficiencies (e.g., motor losses, friction, etc.) can generate heat energy that may cause an increase temperature of a HDD (e.g., depending on cooling). Further, high rotational speeds can increase vibrational amplitudes (e.g., especially where a baricenter of a disk is not at the center of the disk itself).

SDD may deliver rather consistent read/write data transfer rates, however, as the number of individual smaller blocks accessed is increased, data transfer rates may decrease. Data transfer rates for SDDs may be in a range of about 100 MB/s to a rate of more than about a gigabyte per second. In comparison to HDDs, SSDs may tolerate higher temperatures, be more resistant to shock and vibration, be more resistant to magnetic fields. Each block of a flash-based SSD can be erased (e.g., and therefore written) some limited number of times. As an example, a SDD controller may manage erasures to extend longevity for particular uses. As an example, a SSD based on DRAM does not necessarily have a limited number of writes. As to controller firmware for a SDD, a bug or another issue may be a cause of data loss.

A HDD may be accessed using one or more types of busses, for example, consider a parallel ATA (PATA, also called IDE or EIDE), Serial ATA (SATA), SCSI, Serial Attached SCSI (SAS), Fibre Channel, etc. A SDD controller may include an interface (e.g., host interface) for one or more SDDs. For example, a SDD control may provide one or more interfaces selected from SATA, SCSI, SAS, PCI Express, Fibre Channel, USB, PATA, etc.

Another type of interface is referred to as an "Internet Small Computer System Interface" (iSCSI), which is an Internet Protocol (IP)-based storage networking standard. As an example, iSCSI may carry SCSI commands over one or more IP networks to facilitate data transfers. The iSCSI protocol allows a device (e.g., an initiator) to send SCSI commands (CDBs) to one or more SCSI storage devices (e.g., targets), which may be provided in connection with on one or more remote servers. The iSCSI may be implemented as a storage area network (SAN) protocol, for example, to allow an organization to consolidate storage into data center storage arrays while providing hosts (such as database and web servers) with an illusion of locally attached drives.

As an example, information stored in a drive may be "imaged" or "cloned". A cloning process can turn a second drive into a copy of the first; whereas, an imaging process can create a very large backup file (e.g., "image file") from which it may be possible to recreate the drive's contents at a later date, either onto the original drive or onto another drive.

A disk image or image file can be quite large (e.g., greater than several hundred MB) as it may be created via a complete sector-by-sector copy of the source drive medium. A disk imaging utility may omit unused file space from the source drive medium or, for example, compress information to reduce storage requirements (e.g., to form an archive file as a form of an image file). An image file may be in a format that comports with an open standard format or a proprietary format.

As shown in the example of FIG. 1, the one or more data stores 152 associated with the device 110 may store information such as information 180. In the example of FIG. 1, the information 180 can include files and folder 181, one or more user accounts and associated user account settings 182, application configuration data files and associated settings 183, one or more operating system configuration settings (e.g., as stored in one or more registries) 184, and one or more licenses 185 (e.g., or information associated with one or more licenses).

As shown in the example of FIG. 1, the one or more data stores 172 associated with the device 120 may store information such as information 190, which may be duplicate information, for example, a duplicate of the information 180. In the example of FIG. 1, the information 190 can include files and folder 191, one or more user accounts and associated user account settings 192, application configuration data files and associated settings 193, one or more operating system configuration settings (e.g., as stored in one or more registries) 194, and one or more licenses 195 (e.g., or information associated with one or more licenses).

As an example, one or more of the data stores 172 may be used to store information of one or more of the data stores 152. For example, the one or more operating system configuration settings 184 may be duplicated as the one or more operating system configuration settings 194.

While a file backup utility may be executable for storing a user's files or data (e.g., collectively as a folder) or an entire image file, such a utility does not normally provide for storage of a user's "personality, settings and data" in a manner that such information can be used discretely in a restore to restore certain components of the user's data without requiring a complete restore or creating another instance of the user's desktop. For example, what if after a HDD failure the user needs immediate access to their image but there is no replacement HDD available?

As an example, a method can include using of a suitably configured device (e.g., with a browser application) for logging into a cloud application where that cloud application includes reading that user's previously stored personality, settings and data for creating a "cloud" instance of that user's desktop "image" in the cloud, for example, with the same resources (e.g., applications, data, etc.) that exist or existed on a different drive (e.g., a failing HDD, SDD, etc.) that the user had used. In such an example, the user can continue to compute or use her desktop "image" without having to wait for a new drive to be installed (e.g., operatively coupled) and provisioned or restored (e.g., as that desktop "image" can be immediately available from the cloud).

A cloud-based approach, per the foregoing example, can be more expeditious that resorting to a monolithic image (i.e., a monolithic image file of a drive). As an example, for about 40 GB of drive space, about 15 GB to about 20 GB may be user data while the remainder consists of an OS and applications. Copying the entire drive space of about 40 GB to the cloud would take considerable time. For example, given that 40 GB is equivalent to 327680 Mb, for an upload rate of about 2 Mbps, the upload time for the 40 GB of drive space would be theoretically about 2730 minutes (e.g., about 45 hours or about 2 days). In contrast, where the user's personality, settings and data are copied to the cloud (e.g., consider about 15 GB to about 20 GB), for an upload rate of about 2 Mbps, the time would be about 1 day. Such an approach may allow a user to return to her last working state in much less time compared to a monolithic image file approach, for example, especially where the cloud-based approach stores the smallest back-up possible to the cloud (e.g., the smallest back-up possible to enable establishing a usable environment in the cloud that mimics that desired by the user).

As an example, since personality, settings and data can be utilized as such, much more capability may be possible such as the example above of creating a cloud instance of the user's desktop, migration to another platform from the cloud, migrating in place to a new OS (e.g., from the WINDOWS® 7 OS to the WINDOWS® 8 OS, Microsoft Corp., Redmond, Wash.), restoring a registry or other settings after a virus attack or restoring the original OS and then applying personality, settings and data to eliminate "OS rot" (e.g., where a device becomes progressively slower the longer it is used and the more software that is install on it).

As an example, a method can include creating a cloud version of a user's desktop, apps and data which could be accessed via the Internet at any time from any device, for example, that runs a browser application (e.g., for accessing the Internet).

As an example, data from a client (e.g., a client device) may be collected and delivered to the cloud (e.g., a cloud server, etc.) on a routine basis to ensure a complete environment is available, for example, including: desktop icons and locations; list of installed apps; user data (e.g., where apps may be server side); user .ini's for each application, and user profile settings for application; UI settings such as themes, mouse settings, registry settings as needed/desired, accessibility settings; users specific information (e.g., AppData, contacts, My Documents, any user specific application data, etc.); and user accounts (e.g., control panel).

As an example, settings may include file system settings, directory settings, etc., as associated with data files, data objects, etc. For example, given file system settings, a file system (e.g., implemented using a cloud server) may retrieve and/or update one or more data files. As an example, a cloud resource may implement a file system that differs from that of a client device and, in such an example, a converter may provide for converting information (e.g., settings) from one file system specification to another. As an example, a file system may provide for managing access to data of files and, for example, associated metadata. As an example, a file system may provide for managing space (e.g., physical storage space, allocated storage space, etc.). As an example, a file system may provide access to files residing on a server, for example, by acting a "client" for a network protocol (e.g., where the "client" may be a cloud server that establishes an operating system environment for a user using another device connected to the cloud server). Some examples of file systems include FAT, NTFS, exFAT and ReFS file systems As an example, information (e.g., one or more settings, etc.) may pertain to a directory service that may provide for storing, organizing and accessing information in a directory. As an example, a directory may be a map, for example, between names and values.

As an example, operating system environment settings may include various types of settings (e.g., for one or more applications, user profile, file system, directory, etc.) where such settings may assist in establishing a desired user experience with respect to an operating system environment. As an example, settings for applications may be in the form of application configuration data files. As to files and folders, as an example, associated settings may also be included as operating system environment settings (e.g., to manage access to data, metadata of files, etc.). As an example, data (e.g., file data) may be stored in the cloud (e.g., in a cloud resource) and accessed using one or more operating system environment settings (e.g., file system settings, application settings, etc.) to establish an environment to represent a desired user experience.

As an example, a cloud image (e.g., a virtual image) may be remotely built using stored information. As an example, installed apps may optionally get copied to the same directory in the cloud version as is/was on a client version. As an example, a source for one or more apps may reside on one or more cloud servers, for example, in a manner where they are not transferred from a local host. In such an example, user specific app data may be sent from the client to the cloud (e.g., .ini's and \user data). As mentioned, OS UI settings (e.g., WINDOWS® OS UI settings) may be replicated as well to give a user a substantially equivalent experience on the cloud.

As an example, .ini applications may be run against a database of apps available in the cloud as web apps (e.g., FACEBOOK® apps, Saleforce.com® apps, etc.) or web app substitutes for local apps (e.g., OFFICE 365® apps) to published apps, virtualized apps or, for example, a user may specify a location for a local app. Such an approach may, for example, proceed via a set of rules to develop the cloud instance based upon available resources of apps without regard to location to be able to compose and deliver the cloud instance. So on the cloud instance, although in such an example it may look like the same resources or applications as the user's traditional desktop, when the user clicks on an app or launches an app, it may come from any particular source (e.g., local, remote web, streamed, etc.).

As an example, a cloud-based storage approach to user information may provide for disaster recovery. As an example, a user may remotely access a cloud-based version of her desktop and get instant access to her applications and data just as if it was local. Consider the following example scenarios: (i) a user works off a web image from any Internet connected device in his local computer, which may have crashed; and (ii) a user works off a web image on the same local machine that has a failing image where the local machine can be reimaged in the background while the user continues to work using the cloud-based image.

As an example, to keep data traffic to a minimum, a manager application may provide for sending selected application and OS settings to the cloud (e.g., optionally along with data files like a traditional on-line back). As an example, a cloud server may then create a virtual desktop with such settings. As an example, a cloud-based manager application may include features that provide for detection of version of an OS, version of an application, etc., to recreate a substantially complete replica of a user's local system (e.g., client or client device).

Figure 2:
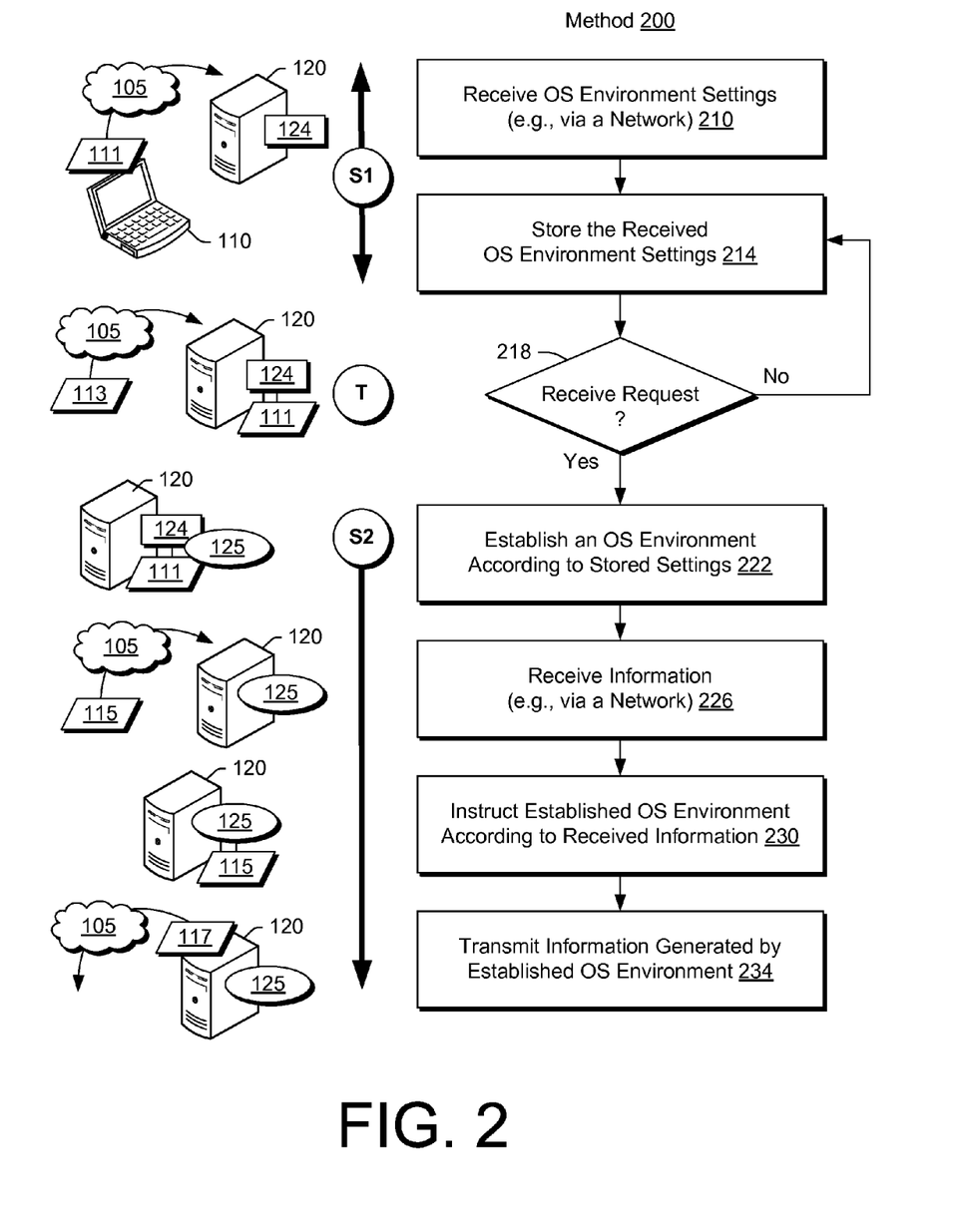
FIG. 2 is a diagram of an example of a method.

FIG. 2 shows an example of a method 200 along with various diagrams that illustrate some equipment as examples upon which the method 200 may be implemented. As shown in the example of FIG. 2, the method 200 may be characterized as included two states (S1 and S2) where a trigger (T) causes a transition from one of the states to the other. As to the equipment, it includes the network 105, the device 110, and the device 120 with memory 124 (e.g., or one or more of the data stores 172) of FIG. 1. Further illustrated are settings 111, a request or trigger 113, an established OS environment 125, information 115, and information 117 as generated at least in part by the established OS environment 125.

As shown in FIG. 2, the method 200 includes a reception block 210 for receiving OS environment settings (e.g., via a network), a storage block 214 for storing the received OS environment settings, a decision block 218 for deciding whether a request has been received, an establishment block 222 for establishing an OS environment according to the stored settings, a reception block 226 for receiving information (e.g., via a network), an instruction block 230 for instructing the established OS environment according to the received information, and a transmission block 234 for transmitting information generated at least in part by the established OS environment. In the example of FIG. 2, the decision block 218 decides to respond to a request (e.g., or trigger) by continuing to the establishment block 222 or decides to continue to another block such as the block 214, for example, to remain in the state S1 rather than transition to the state S2.

As indicated in FIG. 2, the request or trigger 113 may be provided by the device 110 or by another device to the network 105 for receipt by the device 120, which stores or has access to stored settings 111. As shown in FIG. 2, the information 117 as generated at least in part by the established OS environment 125 may be transmitted via the network 105 to the device 110 or to another device. As an example, the information 117 may be information based at least in part on the information 115, which may include instructions, commands, etc., that instruct the established OS environment 125 (e.g., to execute an application, etc.). The information 115 may be transmitted via the device 110 or via another device.

Figure 3:
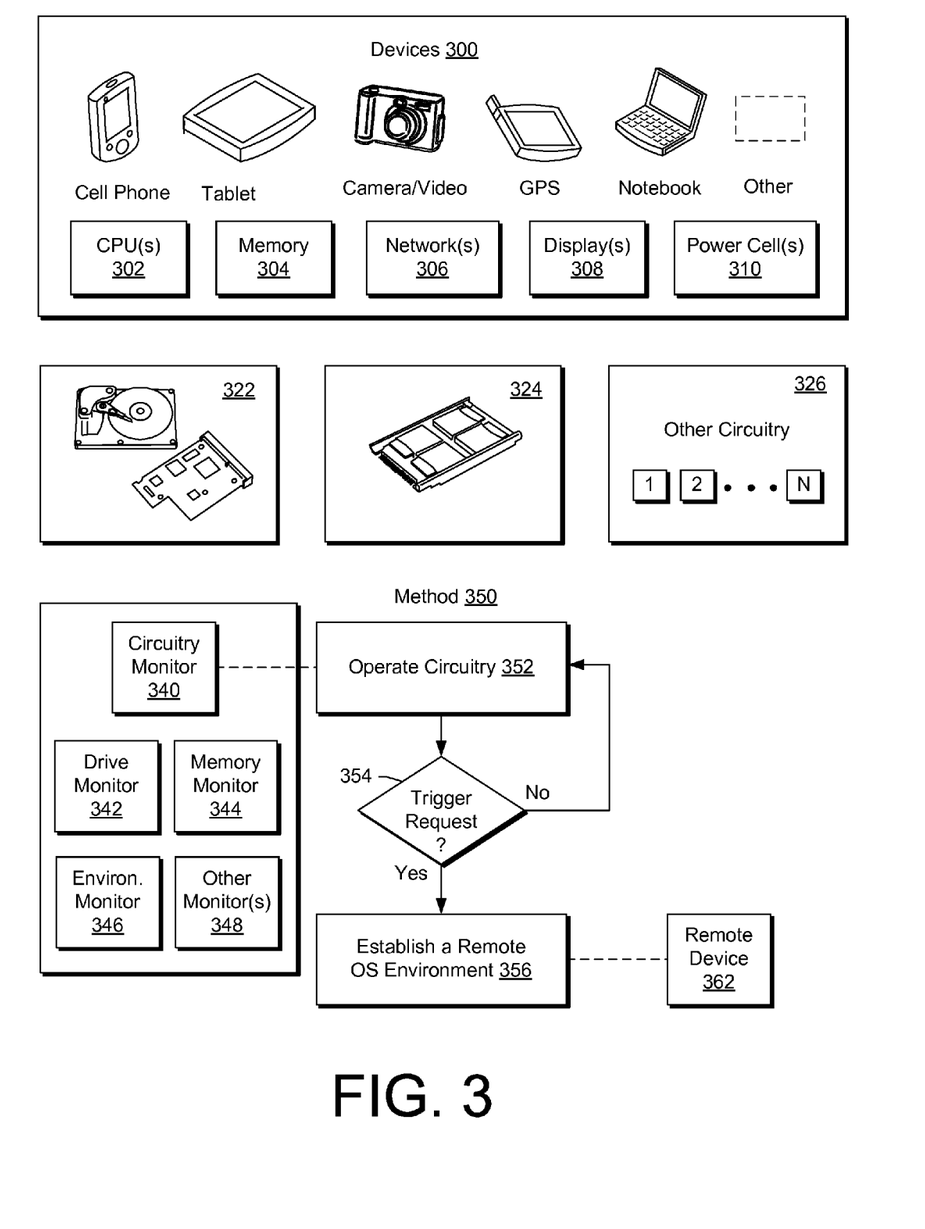
FIG. 3 is a diagram of examples of assemblies and an example of a method.

FIG. 3 shows some examples of devices 300 and an example of a method 350. As shown, the devices 300 may include one or more processors 302, memory 304, one or more network interfaces 306, one or more displays 308 and one or more power cells 310. As shown in FIG. 3, for example, a cell phone, a tablet, a camera, a GPS device, a notebook computer, or other device may be configured to store information remotely, utilize a remotely established OS environment, etc.

As an example, a device may include one or more of a drive such as a HDD 322, a drive such as a SDD 324 and other circuitry 326. As to the method 350, it can include an operation block 352 for operating circuitry, a decision block 354 for deciding whether a trigger or request should be issued, and an establishment block 356 for establishing a remote OS environment (e.g., using a remote device 362). As indicated in FIG. 3, the operation block 352 may include operating a circuitry monitor 340, which may include functionality for a drive monitor 342, a memory monitor 344, an environmental monitor 346 and one or more other monitors 348. As an example, the circuitry monitor 340 may be implemented using a local device such as one of the devices 300 (e.g., remote from the remote device 362).

As to the drive monitor 342, it may monitor a drive for indicia of physical failure, lack of space, software failure (e.g., firmware glitches), etc. In turn, it may cause issuance of a trigger to instruct the method 350 to establish a remote OS environment. As to the memory monitor 344, it may monitor memory for indicia of physical failure, lack of space, software failure, etc. In turn, it may cause issuance of a trigger to instruct the method 350 to establish a remote OS environment. As to the environmental monitor 346, it may monitor one or more environmental conditions such as temperature, power consumption, vibration, shock, etc. In turn, it may cause issuance of a trigger to instruct the method 350 to establish a remote OS environment.

As to the environmental monitor 346, it may provide for shutting down one or more components of a device or one or more components associated with a device. For example, where a user may be using a device while in a vehicle, the monitor 346 may sense vibration above a predetermined threshold (e.g., amplitude, frequency, etc.) and shut down a HDD (e.g., "lock" a head, a platter, etc.) to prevent possible damage (e.g., during read and/or write operations for that HDD, etc.). The monitor 346 may also cause issuance of a trigger such that the user can continue using the device but via a remotely established OS environment, for example, according to settings that have been previously stored remotely for establishing the OS environment. As another example, the monitor 346 may sense an electromagnet field (e.g., as produced by a large magnet, electromagnetic storm, etc.). As an electromagnetic field may interfere with operation of a HDD, the monitor 346 may cause issuance of a trigger such that a user can continue using the device but via a remotely established OS environment. As an example, the monitor 346 may sense temperature versus time and determine that operation of one or more components of a device may be compromised. In turn, the monitor 346 may also cause issuance of a trigger such that the user can continue using the device but via a remotely established OS environment.

As an example, the circuitry monitor 340 may cause issuance of a trigger to store settings remotely, for example, in an effort to preserve a "state" of a device before a failure occurs (e.g., in response to an increased likelihood of failure based on one or more monitored parameters). As an example, the circuitry monitor 340 may provide for issuance of a repair, restore, defragment, etc., command, for example, to be performed once a remotely established OS environment is in use (e.g., in response to a perceived performance-related issue).

As an example, a HDD may be electromechanically one of the hardest-working components in a computer system. A small platter of a HDD may spin at several thousand revolutions per minute while a head smaller than the tip of an ink pen travels above it looking for the exact spot that particular data is stored. Bumps or falls while the platter is in motion can damage the platter, the head, etc. Should a HDD need replacement, often a restore operation is performed (e.g., where the replacement HDD (or medium) does not already include an OS, etc.

As to the drive monitor 342, it may provide for monitoring of one or more types of drive failures, which may be associated with one or more of a HDD, a SDD or a hybrid drive.

Basic types of hard drive failures include: software or firmware damage, which may cause a disk to become unreadable, resulting in the inability to interact properly with a device; problems with a controller board, which may result in electronic failure; mechanical failure where one or more components of a HDD become faulty; and logical corruption, which may occur when there is a problem with the information on the disk.

Some examples of conditions that may be monitored using one or more of the monitors of FIG. 3 include:

(i) Heat: Hardware overheating, for example, due to inadequate ventilation and cooling in and around a drive or due to overworked hardware with little or no downtime.

(ii) Physical Damage: Physical force, such as bumping, jarring, or dropping may lead to physical damage, for example, impact of a read/write head(s) may touch or gouge a disk, causing damage to the platter's magnetic surfaces where the data is embedded (e.g., a head crash), possibly occurring even when powered down.

(iii) Power Surges: Power surge caused by lightning strikes, interference with power lines, or by any event which causes the flow of energy to be interrupted and then restarted, for example, which may result in data loss when the read/write heads fail to function properly.

(iv) Water Damage: Moisture caused by flooding or even by spilling a liquid, possibly causing unwanted electrical currents.

(v) Corrupted Files: Improperly closing a program, turning of a computing device before closing files, installing new software, etc. Power failures and accidental computer shut downs can contribute to corrupted files, and causing damage to the hard drive.

(vi) Human Error: Accidental deletion of files imperative to a disk drive, improper installation and removal of files, activities conducted during a forensic investigation, etc.

Figure 4:
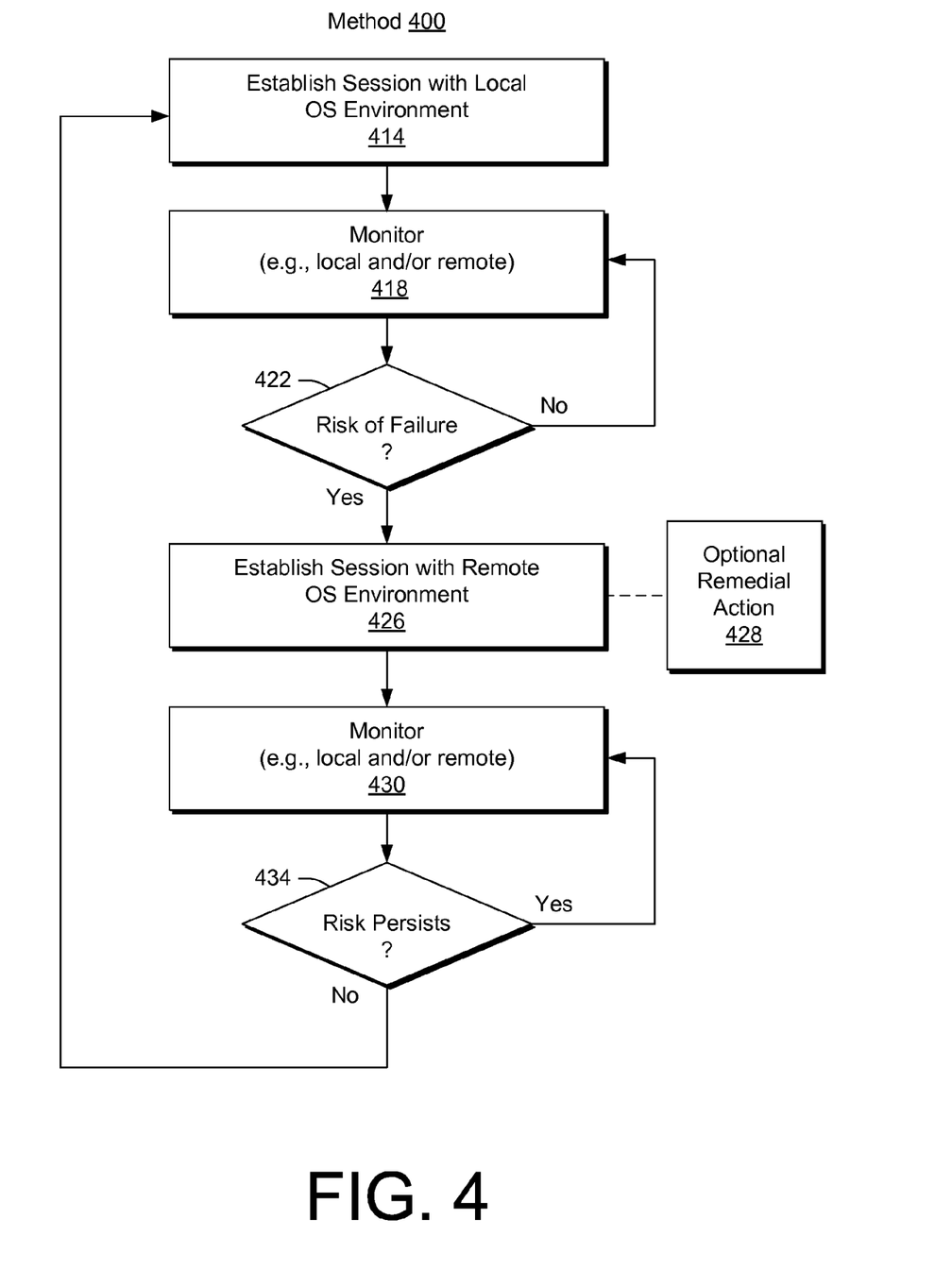
FIG. 4 is a diagram of an example of a method.

FIG. 4 shows an example of a method 400 that includes an establishment block 414 for establishing a session with a local OS environment, a monitor block for monitoring a device or a system (e.g., locally and/or remotely), a decision block 422 for deciding whether a risk of failure exists (e.g., above a threshold level), an establishment block 426 for establishing a session with a remote OS environment, a monitor block 430 for continued monitoring of the device or the system (e.g., locally and/or remotely) and a decision block 434 for deciding whether the risk (or another risk) persists. As shown in the example of FIG. 4, if the decision block 422 decides that a risk of failure exists, the method 400 continues to the establishment block 426 to establish a session with a remote OS environment, optionally with remedial action per a remediation block 428. Where the risk of failure does not exist or otherwise warrant a remote session, the method 400 may continue at the monitor block 418. As to the decision block 434, if it decides that a risk persists (e.g., the risk of failure), then the method 400 may continue in a loop with the monitor block 430.

In the example of FIG. 4, the monitor blocks 418 and 430 may monitor in a similar manner. Alternatively, the monitor block 418 may monitor multiple factors more broadly than the monitor block 430. For example, the monitor block 418 may monitor vibration, temperature, shock, etc. and the monitor block 430 may monitor a select one or more of such conditions depending on the nature of the risk of failure. For example, if the risk of failure resulted from a temperature (or temperature-time) exceeding a predetermined threshold, then the monitor block 430 may monitor the temperature until the risk abates (e.g., a drop in temperature occurs).

As an example, the monitor block 430 may be enabled in part via remote circuitry. For example, a device having a risk of failure may include circuitry to measure temperature and to transmit measured temperature values (e.g., or a metric derived therefrom) via a network to a device that establishes a remote OS environment. In such an example, the remote device may act to terminate a session with the remote OS environment where the risk abates (e.g., the decision block 434 decides that the risk no longer persists). In such an example, circuitry may be in part local and in part remote, for example, depending on state (see, e.g., states S1 and S2 of FIG. 2).

As to remedial action per the remediation block 428, some remedial actions have been mentioned (e.g., to repair, defragment, restore, etc.). Such remedial action may be implemented by circuitry locally or locally and remotely. For example, where a remedial action is restoration of one or more portions of a drive, information to restore those portions may be downloaded to the drive from a remote location (e.g., optionally a remote device that establishes the remote OS environment).

Figure 5:
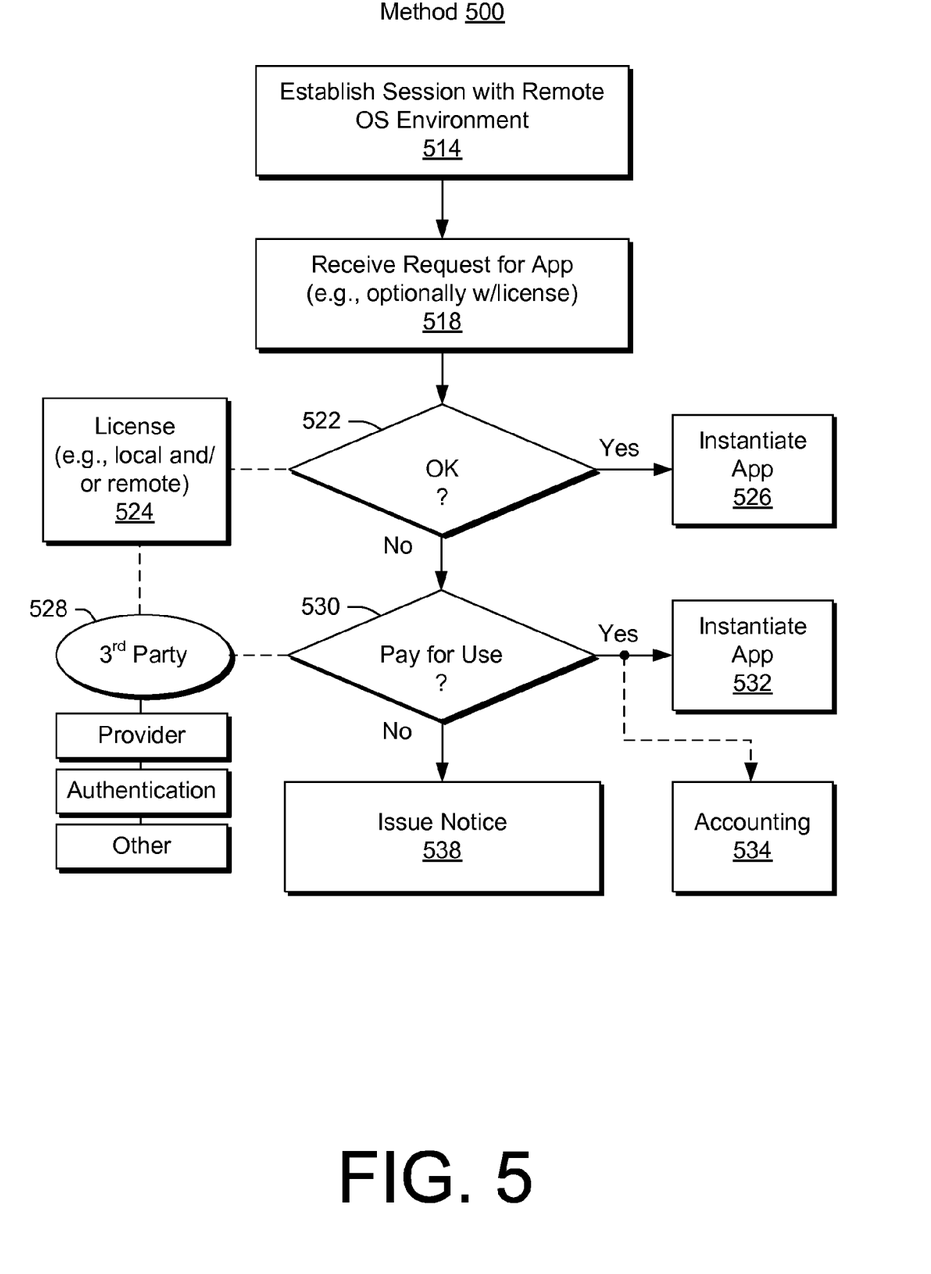
FIG. 5 is a diagram of an example of a method.

FIG. 5 shows an example of a method 500 that includes an establishment block 514 for establishing a session with a remote OS environment, a reception block 518 for receiving a request for an application (e.g., optionally with a license), a decision block 522 for deciding whether it is OK to instantiate the requested application, an instantiation block 526 for instantiating the requested application based on a decision of the decision block 522, an optional license block 524 for accessing a license (e.g., optionally authenticating a license via a third party 528), a decision block 530 for deciding whether a pay for use arrangement is acceptable for using the requested application, an instantiation block 532 for instantiating the requested application if the decision block 530 decides that the pay for use arrangement is acceptable, an optional accounting block 534 for accounting for a pay for use arrangement, and an issue block 538 for issuing a notice if the requested application cannot be instantiated (e.g., for one or more reasons). As an example, the notice may indicate one or more reasons why a requested application cannot be instantiated.

As an example, a requested application may be a licensed application or a non-licensed application. As an example, an application may be an open source application that is not subject to an explicit license for use of the application (e.g., for instantiation of the application). As an example, an application may be instantiated but limited in use absent a license, payment, etc. (e.g., consider a freemium/premimum arrangement for an application).

As to a license, a user may include secure license information in information stored remotely. In such an example, where a request is made to establish a session with a remote OS environment, the request may include user credentials, secret information, a key, etc., that can access, decrypt, etc., the license information for purposes of instantiating an application using the remote OS environment. As an example, a device may include a trusted platform module (TPM) that stores certain information that may be communicated for purposes of instantiating an application remotely.

Figure 6:
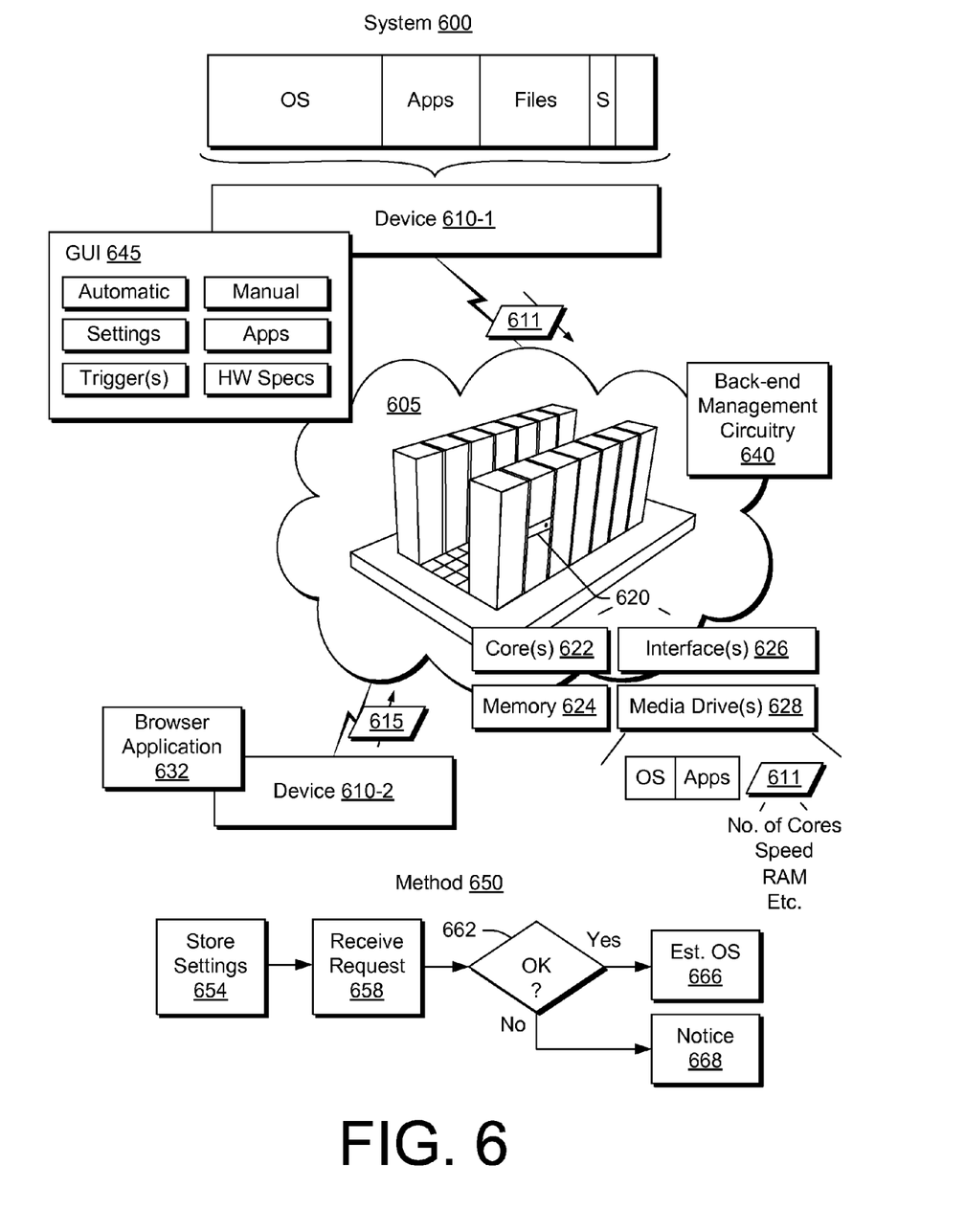
FIG. 6 is a diagram of an example of a system and an example of a method.

FIG. 6 shows an example of a system 600 and an example of a method 650. As shown, the system 600 includes a network 605, a device 610-1, a device 610-2, and a device 620, which may be a server (e.g., a blade, etc.) in a server farm. As shown the device 620 can include one or more cores 622, memory 624, one or more interfaces 626, and one or more media drives 628.

The device 620 may include back-end management circuitry 640, which may provide for establishing a graphical user interface (GUI) 645 on a display associated with the device 610-1. As an example, the GUI 645 may provide graphical controls for selection of control parameters as to automatic operations, manual operations, user settings, applications, triggers, hardware specifications, etc. As an example, the triggers may be associated with one or more monitors (see, e.g., FIG. 3). As an example, an automatic operation may be selected to automatically establish a remote OS environment (e.g., a session with a remote OS environment).

As to hardware specifications, these may be collected automatically, via user input, or a combination of both. As an example, a user may desire more cores for purposes of executing an application that is configured to process threads in parallel on multiple cores (e.g., CPU cores, GPU cores, etc.). In such an example, the user may provide settings for remote storage that indicate a number of cores if that particular application is requested. In such an example, in the context of FIG. 6, the number of cores available on the device 620 may exceed the number of cores available on the device 610-1 (e.g., or the device 610-2).

As an example, information 611 may include one or more settings as associated with one or more parameters set using the GUI 645. Alternatively, as an example, the information 611 may include setting gathered from the device 610-1 (e.g., automatically gathered without use of a selection GUI, etc.).

As an example, the device 610-2 may include a browser application 632, for example, configured to transmit information 615 (e.g., a request) via the network 605 to the device 620, which has access to information 611. In such an example, the device 610-2 may make a request (e.g., the information 615) to establish an OS environment remotely at the device 620, for example, where interaction with that OS environment occurs at the device 610-2 via the browser application 632. In such a manner, a user may recreate a desired environment remotely, even though that user is accessing that remote environment via a device (e.g., the device 610-2) that differs from the device associated with that desired environment (e.g., the device 610-1).

As an example, consider a user with a work computer that cannot be removed from a workplace. That user may travel with another computer that includes a browser application. Should that user require use of an OS environment established according to settings of the work computer, the user may use the browser application to logon onto a remote a work server to establish that OS environment where that work server can access stored settings of the work computer (e.g., regardless of whether the work computer is powered on or off).

In the example of FIG. 6, the method 650 includes a storage block 654 for storing settings (e.g., the information 611), a reception block 658 for receiving a request (e.g., the request 615), a decision block 622 for deciding whether the request is actionable, an establishment block 666 for establishing an OS environment if the request is actionable and a notice block 668 for issuing a notice if the request is not actionable to establish an OS environment.

Figure 7:
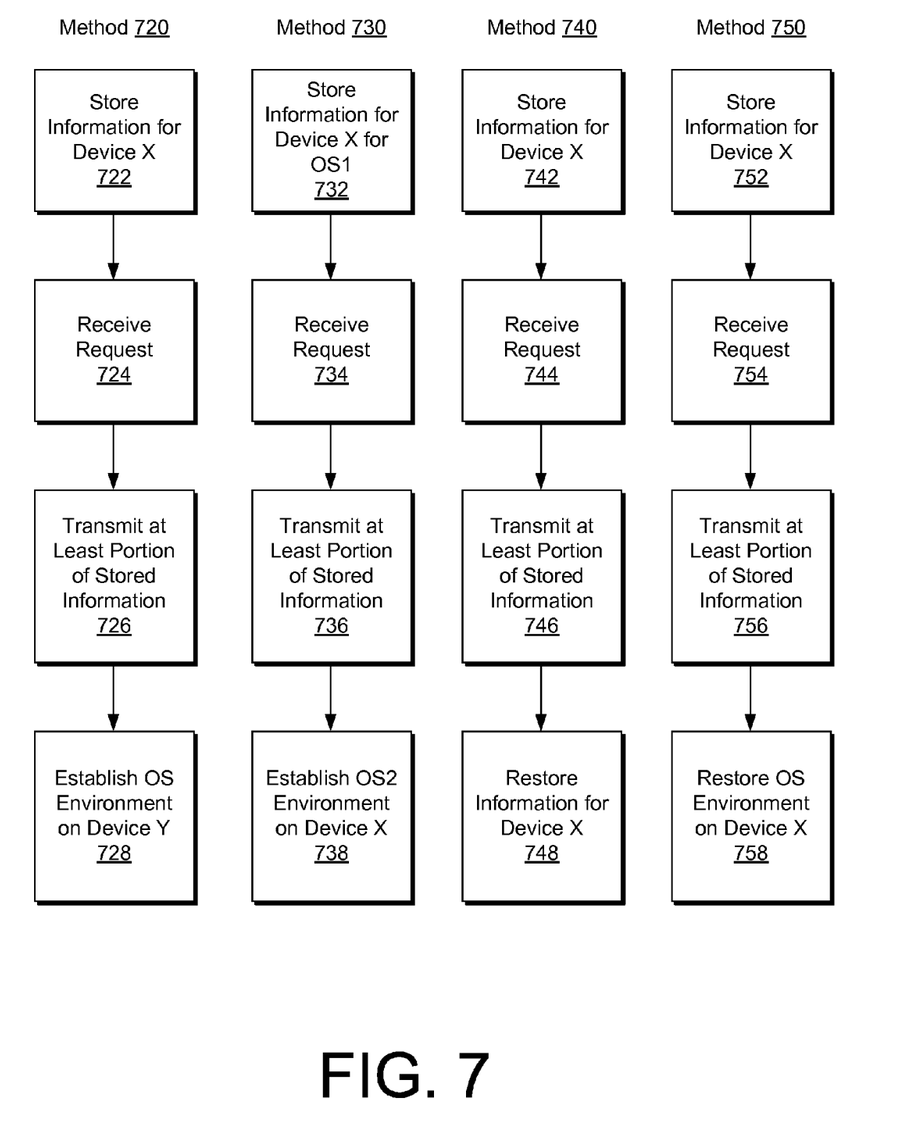
FIG. 7 is a diagram of examples of methods.

FIG. 7 shows examples of methods 720, 730, 740 and 750. As to the method 720, it includes a storage block 722 for storing information for a device X, a reception block 724 for receiving a request, a transmission block 726 for transmitting at least a portion of the stored information, and an establishment block 728 for establishing an OS environment on a device Y. In such a manner, the stored information (e.g., settings, etc.) may provide for migrating to another device (e.g., from device X to device Y, optionally with the same OS).

As to the method 730, it includes a storage block 732 for storing information for a device X for an OS1, a reception block 734 for receiving a request, a transmission block 736 for transmitting at least a portion of the stored information, and an establishment block 738 for establishing an OS2 environment on the device X. In such a manner, the stored information (e.g., settings, etc.) may provide for migrating in place to a new OS (e.g., from OS1 on device X to OS2 on device X).

As to the method 740, it includes a storage block 742 for storing information for a device X, a reception block 744 for receiving a request, a transmission block 746 for transmitting at least a portion of the stored information, and a restoration block 748 for restoring information on the device X. In such a manner, the stored information (e.g., settings, etc.) may provide for restoring a registry or other settings (e.g., after a virus attack).

As to the method 750, it includes a storage block 752 for storing information for a device X, a reception block 754 for receiving a request, a transmission block 756 for transmitting at least a portion of the stored information, and a restoration block 758 for restoring an OS environment on the device X. In such a manner, the stored information (e.g., settings, etc.) may provide for restoring the OS of the device X, for example, where restoring may include applying personality, settings and data to eliminate "OS rot."

Figure 8:
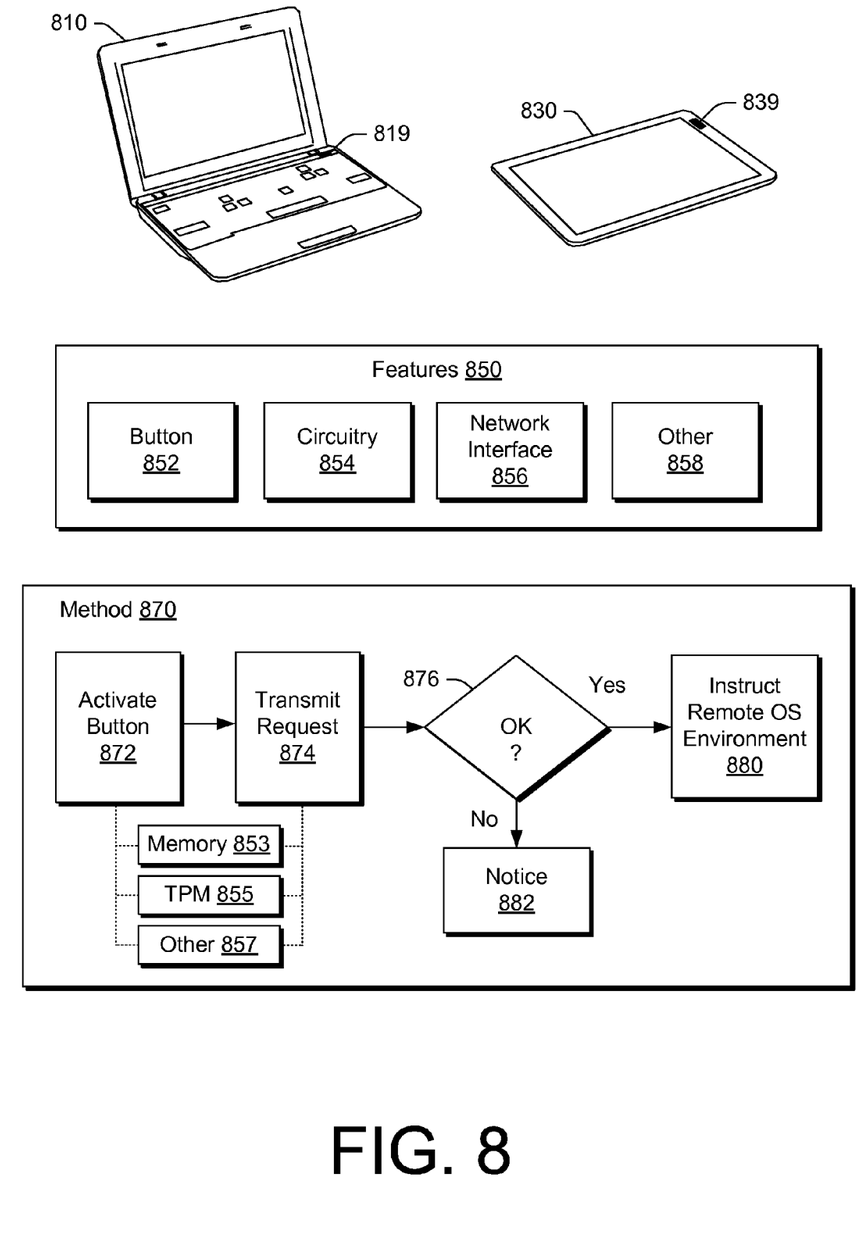
FIG. 8 is a diagram of examples of devices and an example of a method.

FIG. 8 shows examples of devices 810 and 830 and an example of a method 870. As shown, the device 810 includes a button 819 and the device 830 includes a button 839. As an example, the buttons 819 and 839 may be actuatable to transmit a request to establish a remote OS environment for use by the device 810 and 830, respectively. As an example, a device may include features 850, such as, a button 852, circuitry 854, a network interface 856 and one or more other features 858.

As to the method 870, it can include an activation block 872 for activating a button, a transmission block 874 for transmitting a request responsive to activation of the button, a decision block 876 for deciding whether the request is actionable, an instruction block 880 for instructing a remote OS environment where the decision block 876 decides that the request is actionable and a notice block 882 for issuing a notice where the decision block 876 decides that the request is not actionable.

In the example of FIG. 8, the activation block and/or the transmission block 874 may include accessing memory 853, a TPM 855 or other feature 857 of a device or associated with a device, for example, for formulating a request. For example, a request may include logon information or other user credentials. As an example, a credential may be for accessing a remote data store, a remote server, a remote account, etc. As an example, a credential may be a license or associated with a license, for example, for use of an application, for billing use of an application (e.g., on a pay per use arrangement), etc.

As shown in the examples of FIG. 8, the device 810 may be a laptop computer, a netbook, or other clamshell type of device; whereas, the device 830 may be a tablet device (e.g., a smart phone, etc.). As an example, the device 830 may be a detachable display of a device that may include a keyboard portion, a docking portion, etc. In such an example, the detachable display may be operable as a light-weight device that includes a browser application executable to formulate and transmit a request to request establishment and use of a remote OS environment, for example, based on settings, which may be stored in a portion of a system to which the display docks (e.g., consider the lower, keyboard portion of the device 810 as including a drive that stores settings, etc. that have been transmitted to and stored at a remote location).

As an example, a request may be initiated by one or more types of mechanisms. For example, a portable device may be configured for communication with a device such as, for example, the device 810 or the device 830, for purposes of initiating a request. As an example, consider a USB key that includes information that upon insertion into a USB port initiates a request (see, e.g., the transmission block 874). As another example, consider a device configured for wireless communication (e.g., cellular communication, WiFi® communication technology, BLUETOOTH® communication technology, IR communication technology, EM communication technology, etc.) that can communication information to initiate a request (see, e.g., the transmission block 874). As an example, a magnetic card reader, a biometric sensor, a magnetic sensor, a RFID sensor, etc., may be included in a device such as, for example, the device 810 of the device 830, for purposes of initiating a request (e.g., responsive to reading a magnetic card, sensing a feature or features, sensing a magnetic field, sensing an RFID chip, etc.). For example, consider a biometric sensor for reading a fingerprint that upon reading commences an initiation process to transmit a request. As an example, a biometric sensor and associated circuitry may be programmed to initiate one process for one fingerprint and another process for another fingerprint (e.g., consider a right index finger for a normal boot process and a left index finger for a remote process).

As an example, a device may include circuitry for initiating a request from a pre-boot environment (e.g., initiated in part via software, firmware, etc.), from a pre-boot console, from a bootable removable device (e.g., a USB device), etc.

As an example, a method can include receiving operating system environment settings via a network; storing the received operating system environment settings to a storage device; establishing an operating system environment according to the stored operating system environment settings; receiving information via the network; instructing the established operating system environment according to the received information; and, in response to the instructing, transmitting via the network information generated at least in part by the established operating system environment. As an example, such a method may include receiving a request via the network to interact with the operating system environment established according to the stored operating system environment settings.

As an example, a method can include receiving an Internet protocol address. In such an example, the method may include transmitting via a network information generated at least in part by an established operating system environment to the Internet protocol address. Alternatively, such a method may include transmitting the information generated at least in part by the established operating system environment to an Internet protocol address that differs from the received Internet protocol address.

As an example, a method can include instructing an established operating system environment to establish an application within the established operating system environment. In such an example, the application may be a licensed application or an unlicensed application.

As an example, information generated at least in part by an established operating system environment may include information generated at least in part by an established application within that operating system environment.

As an example, a method can include transmitting a request via a network to receive an updated version of operating system environment settings. For example, a pull-model may be initiated by a remote device while a push-model may be initiated by a local device. As an example, a user may optionally select an automatic update option to periodically update a remotely stored version of operating system environment settings.

As an example, a method can include transmitting via a network information to generate a graphical user interface (GUI) that includes graphical controls to select applications executable by an operating system environment established according to operating system environment settings.

As an example, a method can include receiving operating system environment settings that include settings for at least one application executable within an operating system environment established according to the operating system environment settings.

As an example, a method can include receiving information via a network where the information is from an Internet protocol address associated with a client device. In such an example, the client device may have experienced a hardware failure that prevents the client device from establishing an operating system environment on the client device.

As an example, one or more computer-readable storage media can include computer-executable instructions to instruct a computing device to: receive operating system environment settings via a network; store the received operating system environment settings to a storage device; receive a request via the network to interact with an operating system environment established according to the stored operating system environment settings; establish the operating system environment according to the stored operating system environment settings; receive information via the network; instruct the established operating system environment according to the received information; and, in response to instruction of the established operating system environment, transmit via the network information generated at least in part by the established operating system environment. In such an example, instructions may be included to instruct a computing device to execute application code to establish an application within the established operating system environment (e.g., where the application code includes licensed application code).

As an example, a system can include a processor; a memory device having memory accessible by the processor; operating system instructions and operating system environment settings stored in the memory device, the operating system instructions to establish an operating system environment according to the operating system environment settings; a network interface; and circuitry to transmit a request via the network interface, the request to remotely establish the operating system environment according to a remotely stored version of the operating system environment settings.

As an example, a system may include one or more of circuitry to trigger transmission of the request in response to a failure state of the system and a button operable by a user to trigger transmission of the request As an example, a system can include circuitry to interact with a remotely established operating system environment via a network interface, the remotely established operating system environment established according to a remotely stored version of the operating system environment settings.

As an example, a device may include a hypervisor, for example, executable to manage one or more operating systems. With respect to a hypervisor, a hypervisor may be or include features of the XEN® hypervisor (XENSOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable storage media. For example, one or more computer-readable storage media can include computer-executable (e.g., processor-executable) instructions to instruct a device.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 9:
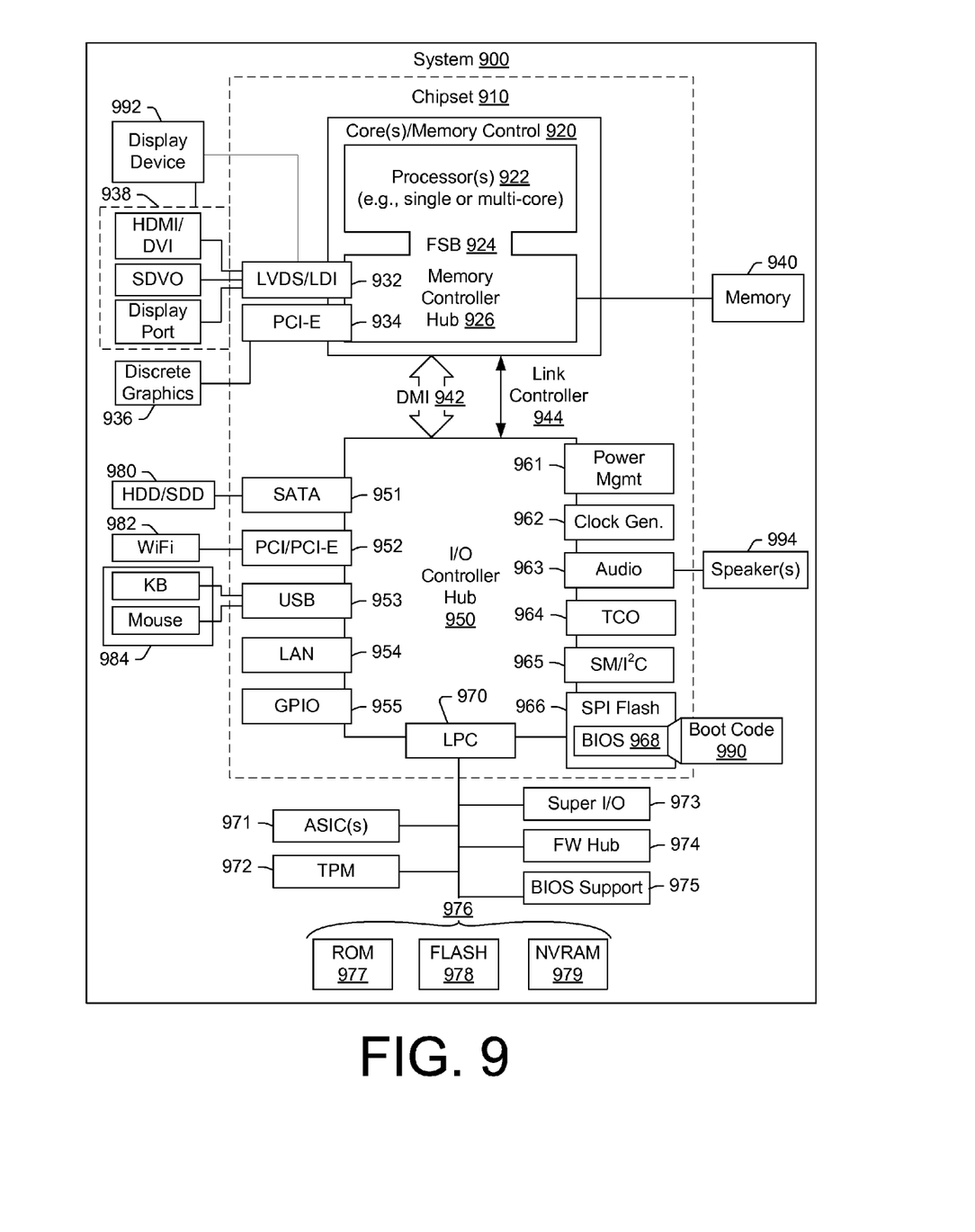
FIG. 9 is a diagram of an example of a machine, some or all of the features thereof may form part or all of a client, a server or other device or system.

While various examples circuits or circuitry have been discussed, FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900.

As shown in FIG. 9, the system 900 includes a so-called chipset 910. A chipset refers to a group of integrated circuits, or chips, that are designed to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (x16) PCI-E port for an external PCI-E-based graphics card. A system may include AGP or PCI-E for support of graphics.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), mice and various other devices (e.g., cameras, phones, storage, media players, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system or component seeking access is the expected system or component.

The system 900, upon power on, may be configured to execute boot code 990 for the BIOS 968, as stored within the SPI Flash 966, and thereafter processes data under the control of one or more operating systems and application software (e.g., stored in system memory 940).

As an example, the system 900 may include circuitry for communication via a cellular network, a satellite network or other network. As an example, the system 900 may include battery management circuitry, for example, smart battery circuitry suitable for managing one or more lithium-ion batteries.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
    receiving operating system environment settings via a network wherein the operating system environment settings comprise application configuration data;
    storing the received operating system environment settings to a storage device;
    receiving a request via the network to interact with an operating system environment;
    in response to the request, establishing an operating system environment according to the stored operating system environment settings;
    receiving information via the network;
    instructing the established operating system environment according to the received information wherein the instructing comprises instructing the established operating system environment to establish an application within the established operating system environment according to the application configuration data; and
    in response to the instructing, transmitting via the network information generated at least in part by the established application.

2. The method of claim 1 wherein the receiving operating system environment settings via a network comprises receiving an Internet protocol address.

3. The method of claim 2 wherein the transmitting via the network comprises transmitting the information generated at least in part by the established operating system environment to the Internet protocol address.

4. The method of claim 2 wherein the transmitting via the network comprises transmitting the information generated at least in part by the established operating system environment to an Internet protocol address that differs from the received Internet protocol address.

5. The method of claim 1 wherein the application comprises a licensed application.

6. The method of claim 1 wherein the application comprises an unlicensed application.

7. The method of claim 1 comprising transmitting a request via the network to receive an updated version of the operating system environment settings.

8. The method of claim 1 wherein the receiving operating system environment settings comprises receiving settings for a plurality of applications executable within an operating system environment established according to the operating system environment settings.

9. The method of claim 1 wherein the receiving information via the network comprises receiving the information from an Internet protocol address associated with a client device.

10. The method of claim 9 wherein the client device comprises a hardware failure that prevents the client device from establishing an operating system environment on the client device.

11. One or more non-transitory computer-readable storage media comprising computer-executable instructions to instruct a computing device to:

receive operating system environment settings via a network wherein the operating system environment settings comprise application configuration data;
store the received operating system environment settings to a storage device;
receive a request via the network to interact with an operating system environment established according to the stored operating system environment settings;
establish the operating system environment according to the stored operating system environment settings;
receive information via the network;
instruct the established operating system environment according to the received information;
execute application code to establish an application within the established operating system environment according to the application configuration data; and
in response to instruction of the established operating system environment, transmit via the network information generated at least in part by the established application.

12. The one or more non-transitory computer-readable storage media of claim 11 wherein the application code comprises licensed application code.

13. A system comprising:
a processor;
a memory device having memory accessible by the processor;
operating system instructions and operating system environment settings stored in the memory device, the operating system instructions to establish an operating system environment according to the operating system environment settings wherein the operating system environment settings comprise application configuration data for an application executable within the operating system environment to generate information;
a network interface; and
circuitry that transmits a request via the network interface, the request to remotely establish the operating system environment according to a remotely stored version of the operating system environment settings that comprise the application configuration data and to remotely establish an application within the remotely established operating system environment according to the application configuration data.

14. The system of claim 13 comprising circuitry that triggers transmission of the request in response to a failure state of the system.

15. The system of claim 13 comprising a button operable by a user to trigger transmission of the request.

16. The system of claim 13 comprising circuitry that interacts with a remotely established operating system environment via the network interface, the remotely established operating system environment established according to the remotely stored version of the operating system environment settings.

17. The system of claim 16 wherein the circuitry that interacts comprises a Web browser.

* * * * *